Aug. 4, 1931.  J. J. N. VAN HAMERSVELD  1,817,721
CHUCK
Filed April 9, 1928   3 Sheets-Sheet 2
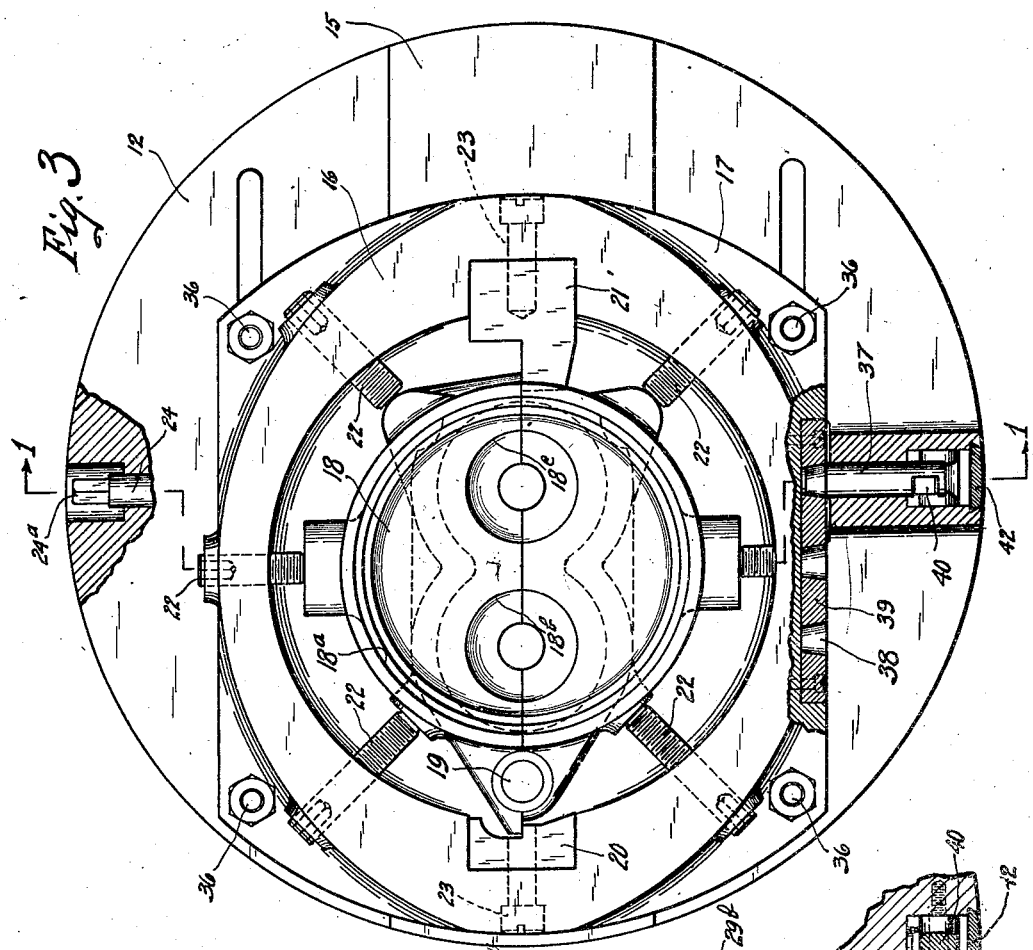
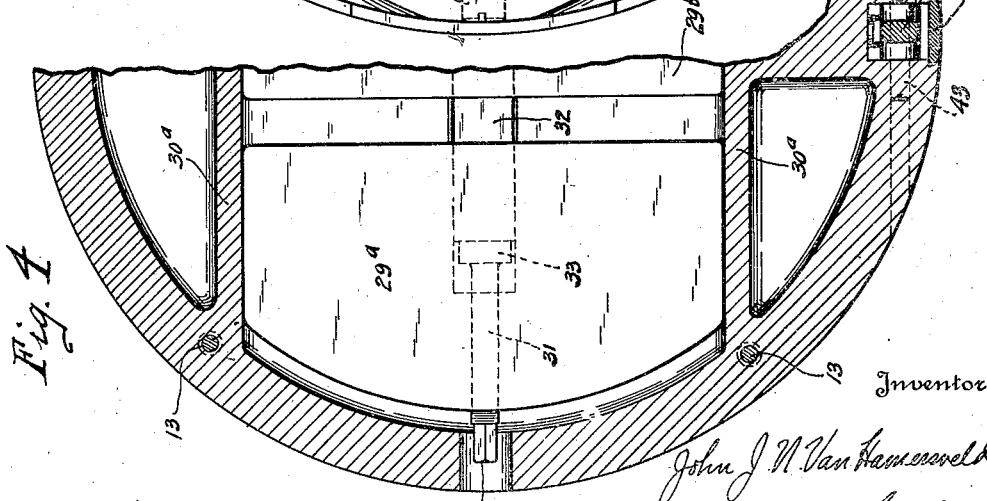
Inventor
John J. N. Van Hamersveld
By Kwis Hudson & Kent
Attorneys

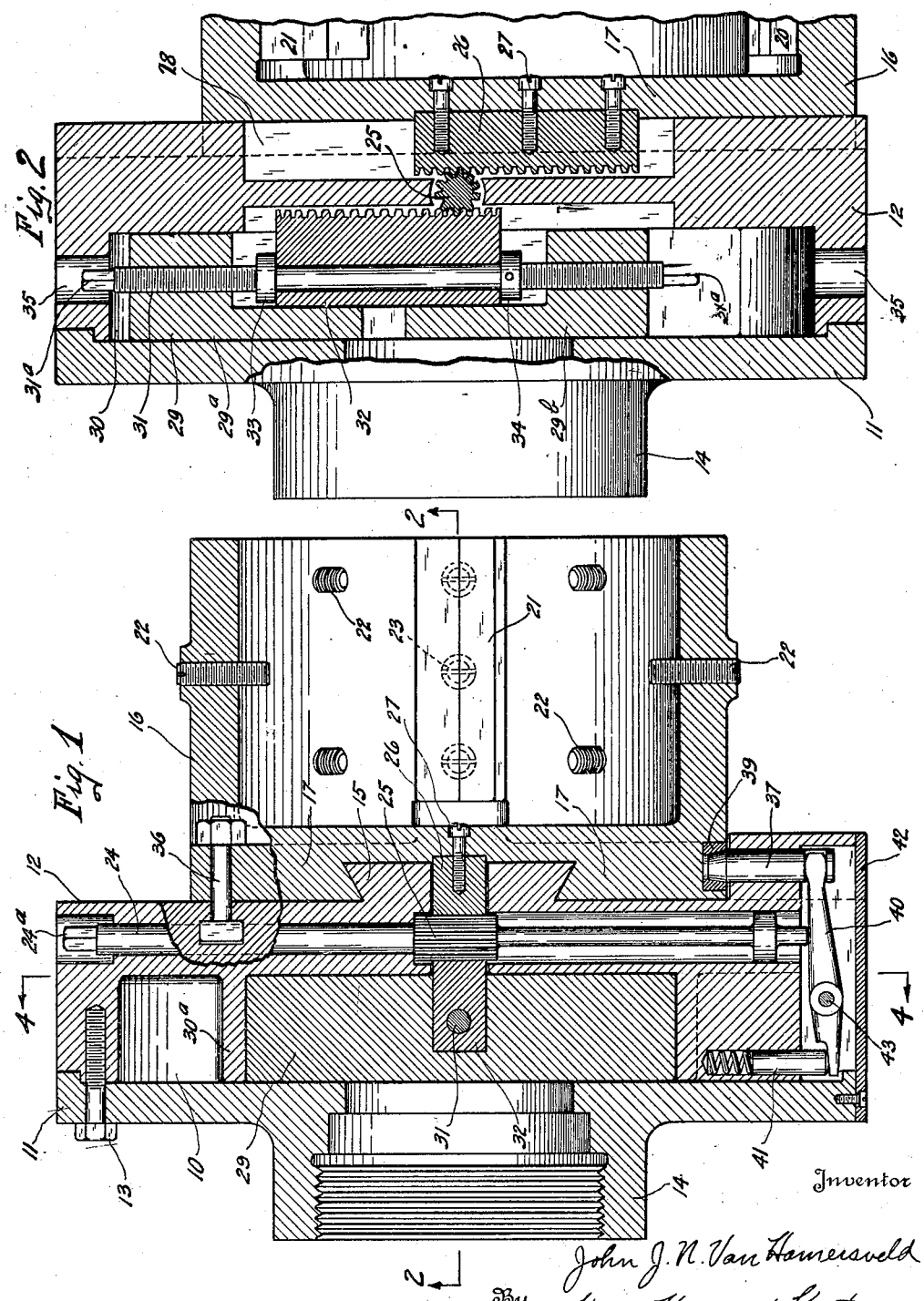

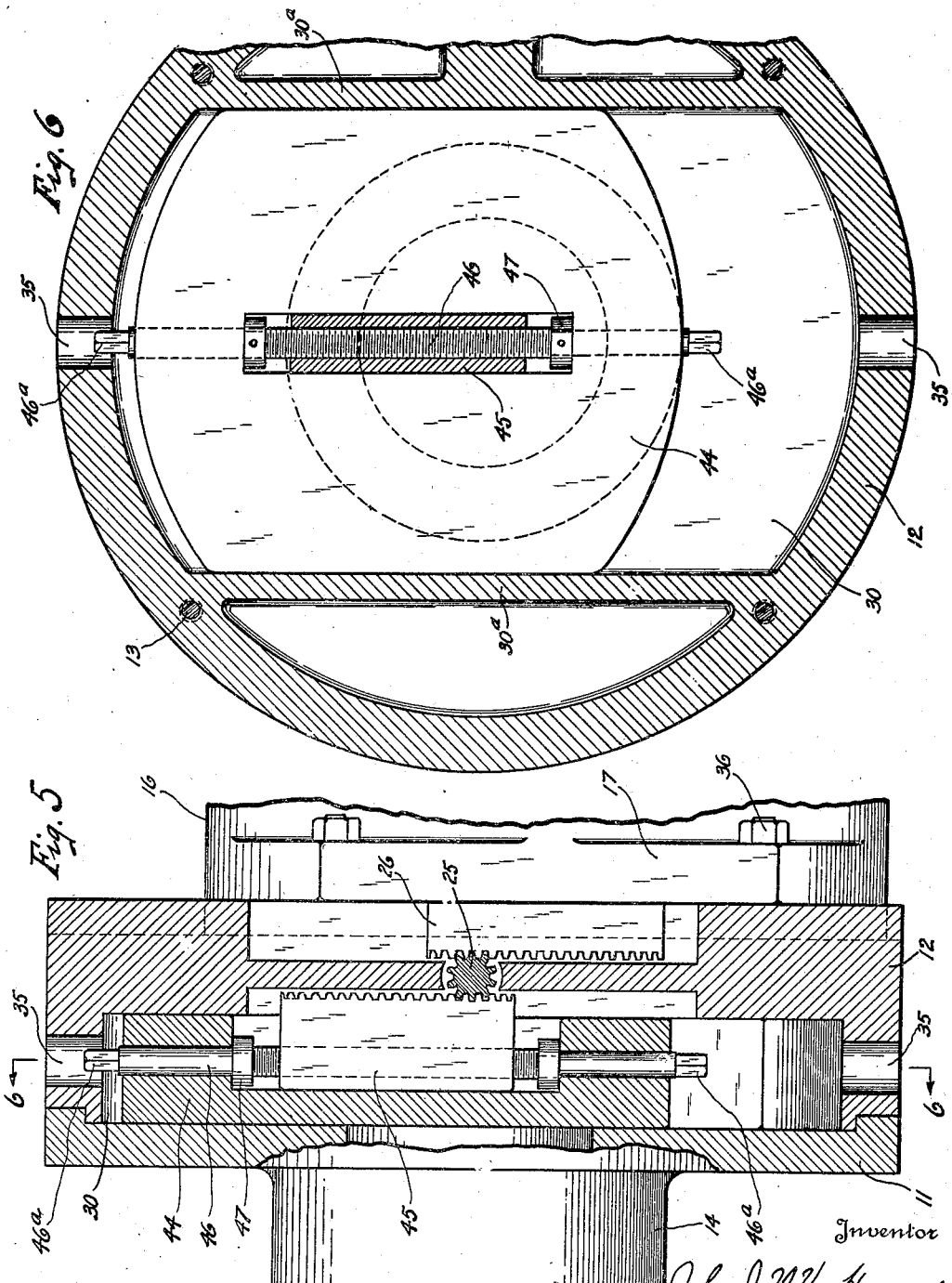

Patented Aug. 4, 1931

1,817,721

UNITED STATES PATENT OFFICE

JOHN J. N. VAN HAMERSVELD, OF CLEVELAND HEIGHTS, OHIO, ASSIGNOR TO THE WARNER & SWASEY COMPANY, OF CLEVELAND, OHIO, A CORPORATION OF OHIO

CHUCK

Application filed April 9, 1928. Serial No. 268,392.

This invention relates to chucks adapted to receive work pieces having laterally offset, concentric portions to be machined and therefore requiring the use of a slide or equivalent device by which the chuck body and work may be moved laterally to bring different portions of the work piece into line with the axis of the machine.

The principal object of this invention is to provide an improved chuck of this nature.

A further object is to provide in the structure a counterweight so disposed with reference to the chuck body and to an actuating member that both the chuck body and counterweight are shifted laterally by the actuating member so that the offset weight of the chuck body and of the work piece will at all times be properly counterbalanced.

A still further object is to provide in the structure a lock bolt or equivalent device for accurately positioning the chuck body in any one of a number of different positions predetermined with respect to a given work piece, this locking device being so disposed that it can be withdrawn and also permitted to reinsert itself into locking engagement with the chuck body by the manipulation of the same part which controls the chuck body and counterweight. In other words, it is one of the objects to construct the chuck, including the chuck body and associated parts so that by the manipulation of one member through the instrumentality of a wrench or equivalent shifting device all three of the parts mentioned, namely, the locking device, the chuck body and the counterweights, will be manipulated.

A still further object is to provide means whereby not only can the counterweight be shifted to compensate for the lateral movement of the chuck but may be actuated to vary its counterweighting effectiveness to adapt it for work pieces of different weights, irrespective of the direction or amount that the chuck body is moved laterally with reference to the center of rotation.

A still further object is to provide means whereby the counterweight may be actuated to vary its effectiveness to adapt it for work pieces of substantially the same weights, but wherein the weight of the work piece is unsymmetrically disposed with reference to its center.

The above and other objects are attained by the present invention which may be here briefly summarized as consisting in certain novel combinations and arrangements of parts and details of construction which will be described in the specification and set forth in the appended claims.

In the accompanying sheets of drawings wherein I have shown one embodiment of the invention, Fig. 1 is a vertical sectional view substantially along the irregular line 1—1 of Fig. 3, the work piece being removed; Fig. 2 is a section taken substantially along the line 2—2 of Fig. 1, a portion of the chuck being broken away; Fig. 3 is a front end view of the chuck with a portion in section, showing the chuck body displaced with its axis laterally of the axis of rotation so that a portion of the work piece offset from the center of the chuck body may be machined; Fig. 4 is a fragmentary sectional view substantially along the line 4—4 of Fig. 1; Fig. 5 is a view similar to Fig. 2 but showing a modification; and Fig. 6 is a sectional view substantially along the line 6—6 of Fig. 5.

Referring now to the drawings, it will be noted that the chuck as a whole includes a part which is adapted to be secured to a rotating spindle, which part may be termed an adapter, and a laterally movable part carried thereby, this latter part being adapted to support the work piece and being generally termed the chuck body. For convenience of assembly, the adapter 10 is preferably composed of two main parts 11 and 12 which are annular members, one centralized on the other and adapted to be rigidly secured together by screws 13. The inner annular member 11 has a threaded boss 14 which may be screwed onto the spindle of a lathe or other machine tool. The front member 12 of the adapter has on its front face a guide 15 which in this instance is undercut or in the form of a dovetail which extends laterally of the axis of the adapter. The guide 15 is adapted to slidingly receive the chuck body 16, which will be suitably constructed to firmly support the work piece. In this instance, the chuck body 16 has a flanged rear wall 17 provided with a dovetailed groove to receive the guide 15, the body being in this instance somewhat oval-shaped.

Though the invention is not limited to a chuck for machining any particular type or form of work piece, the chuck herein illustrated is especially adapted for use in machining multiple bottle molds having a body which is to be machined on what may be termed the center of the mold and two or more individual mold portions laterally offset with respect to each other and to the center of the mold. In this instance, the multiple bottle mold is designated as a whole by the reference character 18, this mold being formed in two halves joined by a hinge pin 19 and having annular portions 18a which are adapted to be turned and faced to fit a companion part of the mold not here illustrated and two individual mold portions 18b and 18c which, as illustrated in Fig. 3, are offset with respect to each other and with respect to the axis of the annular portion 18a, these two portions being adapted to be bored to suit the contour of the bottles to be molded. While the above features of the mold are pointed out they do not form a part of the invention proper.

The work piece is adapted in this instance to be supported in the chuck body on two longitudinally extending rails 20 and 21 which are diametrically opposite each other and by means of a plurality of radially disposed set-screws 22 which are adapted to engage lugs or other appropriate parts formed on the two halves of the mold. The chuck body is given an oval shape to provide thickened portions to accommodate and firmly support the rails 20 and 21, these being held in position by suitable set-screws indicated at 23. These rails 20 and 21 are of suitable length and may be adjusted lengthwise if desired and they may be replaced with others to accommodate work pieces of varying shapes and lengths.

I have provided in my improved chuck means for conveniently shifting the chuck body on the guide 15. This is preferably accomplished by means of an actuating member 24 which extends radially and centrally through the front member 12 of the adapter at right angles to the center of rotation. This actuating member is in the form of a rod which is adapted to be turned and also to be moved endwise for reasons to be explained. At its outer end it is provided with a wrench portion 24a so that a wrench can be readily applied to it to turn it and move it in an endwise direction. This rod is provided near its center, as clearly shown in Fig. 1, with a long faced pinion 25 which engages a rack 26 secured by set-screws 27 or equivalent means on the rear face of the back wall 17 of the chuck body, the guide 15 having a slot 28 cut therein to receive the rack 26, which slot is of such length as not to interfere with the maximum intended lateral movement of the chuck body (note Fig. 2).

The actuating member 24 performs other functions in the respect that it is adapted to shift a locking device which accurately centers the slide in predetermined positions and also shifts a counterweight which is adapted to counterbalance the off-center weight of the chuck body and of the work piece. This last mentioned feature will next be described.

The counterweight which is designated as a whole by the reference character 29 is in the construction illustrated in Figs. 1 to 4 composed of two halves 29a and 29b which are normally held in fixed relation and are shifted as a unit simultaneously with the shifting of the chuck body but in the opposite direction to that in which the chuck body is shifted. The counterweight 29 is carried by the adapter and its two halves 29a and 29b are adapted to be shifted either as a unit when the chuck body is adjusted or relative to each other, for a purpose to be explained, in a recessed portion 30 formed on the rear side of the front member 12 of the adapter, this recessed portion forming a guideway for the movement of the counterweight as a whole or for the relative movement of its two halves. Two opposite sides of the recessed portion 30 are formed by a pair of parallel guide ribs 30a both shown in Fig. 4 and one shown in full lines and the other by dotted lines in Fig. 1.

The two halves of the counterweight are normally held in fixed relation by a connecting member 31 having right and left hand threaded portions which the two halves of the counterweight engage, as clearly shown in Fig. 2. Carried by this member in recessed portions of the two halves of the counterweight is a rack 32 which is held between a fixed shoulder 33 and a collar 34 on the member 31.

This rack is just rearwardly of the front rack 26 carried by the chuck body and it engages the long faced pinion 15 of the actuating member 24, but on the opposite side of the latter with respect to the first mentioned rack 26 so that when the actuating member 24 and the long faced pinion 25 are turned these two racks will move in opposite directions, causing the counterweight and slide to move in opposite directions laterally with respect to the axis of the chuck.

Ordinarily the member 31 is not turned when a series of similar work pieces are being machined in the chuck, but when a work piece having a different weight is to be received in the chuck, it becomes necessary to vary the effectiveness of the counterweight, and this is done by moving the two halves of the counterweight inwardly toward or outwardly away from each other so as to decrease or increase, as the case may be, the counterbalancing effect of the counterweight. That is to say, the relative positions of the two counterweights will be adjusted to suit a particular work piece, and when once they have been adjusted to their correct relative positions or spacing they are thereafter shifted as a unit when the chuck body is shifted. To admit of the counterweight halves being relatively moved by turning the member 31, the opposite ends of this member are provided with wrench portions 31a which are preferably of the same size and similar in shape to the wrench portion 24a of the actuator 24 so that the same wrench can be employed to turn the member 31 as is used to turn the actuator 24. The member 31 extends through the adapter at right angles to and rearwardly of the actuator 24 and access may be had to the opposite ends of the member 31 through openings 35 formed diametrically opposite each other in the peripheral wall of the front member 12 of the adapter, as clearly shown in Fig. 2.

It might be noted, before passing to the description of the other parts of the chuck, that the counterweight 29 is completely housed in what may be termed a compartment of the adapter, the walls of the compartment being amply heavy to avoid breakage and injury in the event that centrifugal force acting on the counterweight should be great enough to throw it outwardly beyond the position that it is intended to occupy. In other words, there is an ample factor of safety in the event of breakage of any of the parts which hold the counterweight in any position to which it has been adjusted.

Thus it will be seen that by turning the actuator 24 to position any of the portions 18a, 18b or 18c of the work piece centrally with respect to the axis of rotation both the chuck body and counterweight are shifted simultaneously until the chuck body has been moved to the desired position. Then the chuck body is clamped in that position by means of a set of clamping bolts 36, one being shown in Fig. 1 and the entire set in Fig. 3. These clamping bolts extend through the flanged rear portion of the chuck body into T-slots formed in the front member 12 of the adapter. They must, of course, be loosened before the chuck body can be shifted, and after the chuck body has been moved to the desired position, they will be tightened so as to firmly secure the chuck body to the adapter.

It is desirable that the chuck body be very accurately positioned in order that the different parts of the work piece which are to be machined will in the finished mold have the exact relative positions. Accordingly, I provide as a part of my improved chuck a locking device which will center the chuck or accurately position it when it has been moved to substantially its correct position.

This locking device is preferably in the form of a lock bolt 37 which, as clearly shown in Figs. 1 and 3, is carried by the front portion of the adapter opposite the chuck body, and has a tapered inner end which is adapted to engage in any one of a series of correctly positioned sockets 38 formed in the rear portion of the chuck body. This series of sockets 38 lie in a line which is parallel with the guide 15 and therefore in the direction of movement of the chuck body on the adapter so that the inner end of the lock bolt will be enabled to engage in the appropriate socket of the series. With a work piece which is to be provided with three machined portions such as herein described, there will be three of the sockets 38, but of course this chuck is not limited to work pieces having three portions to be machined on different axes, and it will be understood that if the number or location of the portions to be thus machined varies with different work pieces, the proper number and location of sockets 38 will be provided. In this instance I show these sockets formed in a removable piece 39 which is attached to a straight portion at the rear part of the chuck body.

As a further feature of this part of my invention, I provide means whereby this lock bolt is shifted by the movement of the actuator 24, and in order that this may be done the actuator is designed to be given an endwise movement as well as a rotary movement, the endwise movement withdrawing the lock bolt from the chuck body. To accomplish this, the lock bolt is arranged directly in front of the actuator adjacent one end thereof and it is adapted to be shifted by a lever 40 which is arranged in line with the actuator 24 and is normally engaged by the end thereof.

One end of this lever engages the lock bolt and the other end is engaged by a spring actuated plunger 41 which restores the lock bolt to locking engagement with the chuck body and maintains a constant pressure on the lock bolt to normally keep it in locking position. The spring is also designed to move the actuator 24 back to its normal position. It will be noted that the lever is situated in a recessed portion of the adapter at the periphery thereof, this recess being covered by a cap 42 which is dovetailed in the body and held from endwise movement by a screw, (see Fig. 1). The lever 40 is pivotally mounted in this recess on a bearing pin 43 supported in the walls of the adapter on opposite sides of the recess in the manner indicated in Fig. 4.

The following is a brief description of the operation: When it is desired to shift the chuck body, the clamping bolts 36 are loosened. Then the operator applies a wrench to the portion 24a of the actuator 24 and pushes the actuator inwardly so as to move it in an endwise direction and thereby withdraw the lock bolt from the socket of the chuck body. He will then turn the wrench so as to turn the actuator, and as soon as he has very slightly turned the actuator the endwise pressure can be released so that the inner end of the lock bolt will bear against the chuck body or strip 39 in case the latter is employed, and therefore be in position to snap into the next socket 38 as soon as the chuck body, by further rotation of the actuating member, has been moved far enough to enable this to occur. The chuck is now positioned to permit one of the designated portions of the work piece to be machined. As soon as the chuck is in this position the clamping bolts 36 are tightened, whereupon the chuck as a whole can be rotated and the necessary machine work done. The pinion 25 is long enough so that when the actuator is moved in an endwise direction to withdraw the lock bolt it maintains its engagement with the two racks 26 and 32 connected respectively to the chuck body and counterweight.

It will be understood from what has gone before that as the actuator 24 is turned to shift the chuck body laterally the counterweight is simultaneously shifted in the opposite direction for the purpose already explained.

As previously stated, the member 31 is normally not adjusted but when a new series of work pieces of a different size and weight are to be machined, then and then only will the member 31 be turned to change the relative positions of the two halves of the counterweight to adapt the counterweight to the new work pieces and to enable it to counterbalance the off-center weight of the chuck body and work pieces in the different positions to which the chuck body and work piece may be moved laterally to enable the intended machine work to be done.

It is not essential, in order to vary the effectiveness of the counterweight, that it be formed in two halves as in the construction of Figs. 1 to 4, although the latter construction is preferable and has great utility when the work pieces vary in size and weight but wherein the weight is substantially symmetrical with reference to the center of the centrally disposed machined portion of the work piece. If work pieces of substantially the same size and weight but with the weight distributed unsymmetrically with reference to the center of the centrally disposed machined portion are to be machined, a different counterweight construction and a somewhat different mode of varying the effectiveness of the counterweight are desirable. In Figs. 5 and 6 I have illustrated a construction which may be employed advantageously under the conditions last stated, and as here illustrated the counterweight is in one piece and therefore the whole counterweight is adjusted in one direction or the other to vary its effectiveness to balance the unsymmetrical portion.

In this construction a one-piece counterweight 44 is mounted for sliding movement in the compartment 30 formed between the ribs 30a, as in the first construction. This counterweight has attached to it a rack 45 arranged as in the first instance with reference to the actuating pinion 25. The rack is connected to the counterweight by a connecting member 46 having a central threaded portion engaging in a threaded bore of the rack. This connecting member has unthreaded portions extending through the peripheral portions of the counterweight and it is held from endwise movement relative to the counterweight by two collars 47 which are pinned or otherwise secured to the connecting member and engage inner shoulders of the counterweight, as clearly shown in Figs. 5 and 6. As in the first construction this connecting member has its ends 46a shaped to accommodate a wrench.

Normally the connecting member 46 is not turned in the use of the chuck and under normal conditions the counterweight is moved simultaneously with the movement of the chuck body by the same means as previously described. However, when the work piece is unsymmetrical with reference to the center of the centrally disposed machined portion, the connecting member 46 will be turned to adjust the position of the counterweight in its guideway of the chuck body so as to compensate for the unsymmetrical portion of the work piece. The turning of the connecting member 46, of course, moves the counterweight as a whole relative to the rack 45, thus causing the counterweight to be brought more closely to one end of the rack than to the other. In Fig. 5 the rack is arranged centrally with respect to the counterweight and the turning of the connecting member simply varies this central relationship illustrated by moving the counterweight in one direction or the other relative to the rack.

When once the position of the counterweight has been adjusted for an unsymmetrical work piece, its position with reference to the rack 45 will remain the same throughout the machining of the work piece, but, obviously, when the chuck body and work piece are moved laterally across the face of the adapter, thus coincidentally shifting the counterweight through the action of the pinion 25 on the rack 45, the counterweight will have a different counterweighting effect in the latter position of the work piece than in its previous position.

As previously stated, this particular counterweight is employed when work pieces are of about the same weight but are unsymmetrical in shape and in the distribution of weight, whereas the two-part counterweight is employed when the work pieces are symmetrical but vary in weight. If desired, the chuck may be furnished with both kinds of counterweights, one to be used under certain conditions and the other to be used under other conditions, it being only necessary for the workman to replace one counterweight with its rack and connecting member with another counterweight unit.

While I have shown and described the preferred construction, I do not wish to be confined to the precise details or arrangements shown but aim in my claims to cover all modifications which do not involve a departure from the spirit and scope of the invention.

Having thus described my invention, I claim:

1. A chuck having a supporting portion, a work holding portion, a counterweight, both movable laterally with respect to the axis of the supporting portion, and means for simultaneously shifting the work holding portion and counterweight.

2. A chuck having a supporting portion, a work holding portion adjustable laterally with respect to the axis of the supporting portion, an adjustable counterweight, and a single adjusting member for both the work holding portion and the counterweight.

3. A chuck comprising a supporting portion, a chuck body adapted to receive a work piece, a counterweight, the chuck body and counterweight being both carried by the supporting portion, and means for simultaneously adjusting them in opposite directions.

4. A chuck comprising a supporting portion, a chuck body for receiving a work piece mounted to slide laterally on the supporting portion, a locking device for holding the chuck body in predetermined positions, and an actuating member arranged to disengage the locking device from the chuck body and to shift the chuck body laterally.

5. A chuck comprising a supporting portion, a chuck body slidable laterally thereon, a locking device engageable with the chuck body to center it in predetermined positions, actuating means connected to the locking device and a counterweight adapted to be shifted oppositely to the movement of the chuck body.

6. A chuck comprising a supporting portion, a chuck body slidable laterally thereon, a locking device engageable with the chuck body to center it in predetermined positions, a counterweight adapted to be shifted oppositely to the movement of the chuck body, and a single member for actuating the locking device and counterweight.

7. A chuck comprising a supporting portion having a chuck body and a counterweight movable laterally in opposite directions, a locking device for centering the chuck body in predetermined positions, and a single actuating member for the chuck body, counterweight and locking device.

8. A chuck comprising a supporting portion having a chuck body and a counterweight movable laterally in opposite directions, a locking device for centering the chuck body in predetermined positions, and an actuating member movable in two different directions and operatively connected with the locking device, chuck body and counterweight.

9. A chuck comprising a supporting portion having a housing, a chuck body slidably engaging the front thereof, and a counterweight completely housed in the supporting portion and shiftable laterally therein.

10. A chuck comprising a supporting portion adapted to be rotated, a chuck body having sliding engagement with the supporting portion, a locking device for centering the chuck body in predetermined positions, actuating means connected to the locking device, and additional means for clamping the chuck body to the supporting portion in any of said predetermined positions.

11. A chuck comprising a supporting portion, a laterally movable chuck body, and a laterally movable counterweight, said counterweight being composed of a plurality of members movable as a unit and relatively movable laterally with respect to each other.

12. A chuck comprising a supporting portion adapted to be rotated, a chuck body slidingly engaging the same, a counterweight carried by the supporting portion, said counterweight being composed of members connected together and normally movable as a unit, and means for changing the relative positions of said members.

13. A chuck comprising a supporting portion adapted to be rotated, a chuck body slidingly engaging said supporting portion, a counterweight slidingly carried by the supporting portion, and means for shifting the chuck body and counterweight comprising a rotatable member, and rack and pinion connections between said member and both the chuck body and counterweight.

14. A chuck comprising a supporting portion adapted to be rotated, a chuck body slidingly engaging said supporting portion to move laterally thereon, a lock bolt carried by the supporting portion adapted to engage the chuck body to center it in predetermined positions, and a spring actuated lever connected to the lock bolt to actuate it.

15. A chuck comprising a supporting portion adapted to be rotated, a chuck body slidingly engaging said supporting portion a counterweight carried by the supporting portion, a lock bolt for positioning the chuck body in predetermined positions, a member engaging the lock bolt to shift the latter, and means operatively connected with the chuck body and counterweight to shift the counterweight and arranged also to actuate said member.

16. A chuck comprising a supporting portion adapted to be rotated, a chuck body carried by said supporting portion so that it may be moved laterally of the axis of rotation, and a lock bolt carried by the supporting portion for positioning the chuck body in predetermined positions, said chuck body having a removable member with sockets of a predetermined number and spacing adapted to receive the end of the lock bolt.

17. A chuck comprising an adapter designed for connection with a rotatable member, a chuck body supported by said adapter and movable laterally thereof, said adapter having a solid peripheral portion and having inside said peripheral portion a recessed portion forming a guideway parallel to the direction of movement of the chuck body, and a counterweight slidingly supported in said guideway.

18. A chuck body comprising an adapter arranged to be connected to a rotary member, a chuck body and a counterweight both carried by the adapter for movement in opposite directions laterally of the axis of rotation, and means for simultaneously shifting the chuck body and counterweight comprising a shaft having a pinion between the counterweight and chuck body, and a pair of racks both engaging the pinion and one connected with the chuck body and the other with the counterweight.

19. A chuck body comprising an adapter designed for connection with a rotary member, a chuck body and a counterweight mounted for movement in opposite directions laterally of the axis of rotation, means for simultaneously shifting the chuck body and counterweight comprising a shaft having a pinion between the counterweight and chuck body, a pair of racks both engaging the pinion and one connected with the chuck body and the other with the counterweight, and a lock bolt adapted to engage the chuck body to correctly position the latter, said shaft being arranged for endwise movement to withdraw the lock bolt.

20. A chuck body comprising an adapter designed to be connected to a rotary member, a chuck body and a counterweight mounted for movement in opposite directions laterally of the axis of rotation, means for simultaneously shifting the chuck body and counterweight comprising a shaft having a pinion between the counterweight and chuck body, a pair of racks both engaging the pinion and one connected with the chuck body and the other with the counterweight, a lock bolt adapted to engage the chuck body to correctly position the latter, said shaft being arranged to withdraw the lock bolt, and spring means arranged to restore the lock bolt and to shift said shaft to its normal position.

21. A chuck comprising a supporting portion having a chuck body and a counterweight both movable, means for simultaneously moving the chuck body and counterweight in opposite directions, and separate means for adjusting the counterweight to vary its effectiveness.

22. A chuck comprising a supporting portion having a movable chuck body and a movable counterweight, an actuating member in the form of a pinion for simultaneously shifting the chuck body and counterweight in opposite directions, and a separate actuating member in the form of a screw for adjusting the position of the counterweight relative to the chuck body to vary its counterbalancing effectiveness.

In testimony whereof, I hereunto affix my signature.

JOHN J. N. VAN HAMERSVELD.